United States Patent [19]

Coldren

[11] 4,347,024
[45] Aug. 31, 1982

[54] TENSION INDICATING AND LOCK CONE WASHER

[75] Inventor: Chester P. Coldren, Canton, Ohio

[73] Assignee: Eaton Corporation, Cleveland, Ohio

[21] Appl. No.: 180,289

[22] Filed: Aug. 22, 1980

[51] Int. Cl.³ ............................................. F16B 43/00
[52] U.S. Cl. ....................................... 411/11; 411/156
[58] Field of Search .................. 411/11, 10, 9, 8, 156, 411/155

[56] References Cited

U.S. PATENT DOCUMENTS

| 2,781,687 | 2/1957 | Knocke | 411/11 |
| 3,174,386 | 3/1965 | Lewis . | |
| 3,285,120 | 11/1966 | Kartiala | 411/8 |
| 3,476,009 | 11/1969 | Markey | 411/11 |
| 3,888,289 | 6/1975 | Reynolds | 411/155 |
| 4,047,463 | 9/1977 | Coldren . | |
| 4,061,073 | 12/1977 | Easter et al. . | |
| 4,164,164 | 8/1979 | Trungold . | |

FOREIGN PATENT DOCUMENTS

| 107913 | 7/1939 | Australia | 411/155 |
| 481228 | 3/1938 | United Kingdom | 411/155 |

*Primary Examiner*—Ramon S. Britts
*Attorney, Agent, or Firm*—C. H. Grace; F. M. Sajovec

[57] ABSTRACT

A tension indicating and cone lock washer (10) for use in connection with a headed fastener (B) and a bearing surface (S) is provided. The washer has a generally annular body (12) with an aperture (14) therethrough. The body is of a generally frustoconical cross-section. A generally radially extending through slot (22) is provided and the remaining material aligned with the slots define at least one web (24 or 26). The washer is intended to crack along the webs at a first compression force and to act as a lock washer and not completely flatten until a second compression force, greater than the first compression force, is applied thereto.

4 Claims, 5 Drawing Figures

TENSION INDICATING AND LOCK CONE WASHER

BACKGROUND OF THE INVENTION

1. Field of the Invention

This invention relates to cone type lock washers for use with headed bolts and in particular to cone type lock washers having means to indicate that a tension within a predetermined range of tensions has been realized in a bolt.

2. The Prior Art

Controlling the amount of tension in a bolt is often a critical parameter in various assembly operations. If a bolt is not tight enough (i.e. if the bolt is undertensioned), the joint of which the bolt as a member may not be as strong as required and/or the bolt may further loosen under the effects of vibration and the like. On the other hand, if the bolt is tighter than desired (i.e. if the bolt is overtensioned), the bolt may be over stressed and subject to failure.

One prior art technique for controlling the tension in a bolt to a predetermined tension, or range of tensions, was to attempt to control the torque at which the bolt, or a nut associated therewith, was tightened. This method is not totally satisfactory as the control of applied torque by manual and/or automatic methods is difficult, torque indicating or limiting tools may not be available, and further as the correlation of applied torque to tension is often subject to large variations.

Other methods to control tension in bolts have involved washers or bolt heads which were designed to deform or otherwise indicate that a predetermined axial compression had to be applied thereto which compression equalled the tension in the bolt. Such methods generally provided an accurate indication of tension, but were not totally satisfactory as the washers or bolt heads were complicated and/or expensive to produce, indicated only one of either an over or under tension condition, required visual inspection, required extensive redesign to modify the torque indicated, required the washer to be substantially flattened and/or were not suitable for reuse as a lock washer.

SUMMARY OF THE INVENTION

The drawbacks of the prior art have been overcome or minimized to the extent that a relatively simple and inexpensive cone type lock washer is provided which will give a visually, manually and audibly detectable indication when tension in a bolt reaches at least a predetermined minimum value, will indicate when tension in a bolt exceeds a predetermined maximum value and will function as a lock washer to apply tension to the bolt to resist loosening caused by vibration or the like. The present invention also provides a basic washer which is quickly and easily modified to vary the predetermined minimum tension sensed thereby. The above is accomplished by providing a conical, or cone, washer having a generally radially extending through slot extending from adjacent the inner diameter to adjacent the outer diameter thereof. The washer, when axially compressed between a bolt head and a bearing surface will crack along the slot in a visually, manually and audibly detectable manner when a predetermined minimum tension is in the bolt and then function as a split cone washer. The resulting split cone washer will resist flattening thereof until a predetermined maximum tension is in the bolt. The cross-section of the web or webs defined by the remaining material aligned with the slot may be varied by grooves or the like to vary the torque at which the washer will crack to form a split lock washer.

Accordingly, it is an object of the present invention to provide a new and improved washer to indicate tension in an associated bolt.

This and other objects and advantages of the present invention will become apparent from a reading of the description of the preferred embodiment taken in connection with the attached drawings.

DETAILED DESCRIPTION OF THE PREFERRED EMBODIMENT

Figure 1:
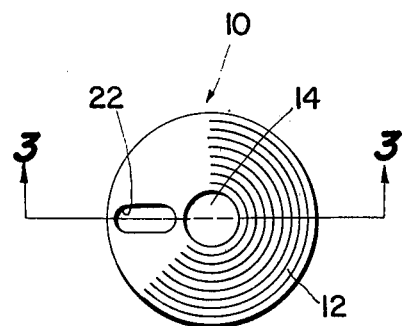
FIG. 1 is a top plan view of the washer of the present invention.
Figure 2:
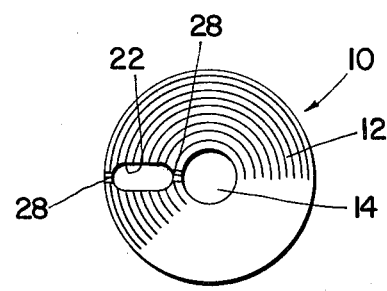
FIG. 2 is a bottom view of the washer illustrated in FIG. 1.
Figure 3:
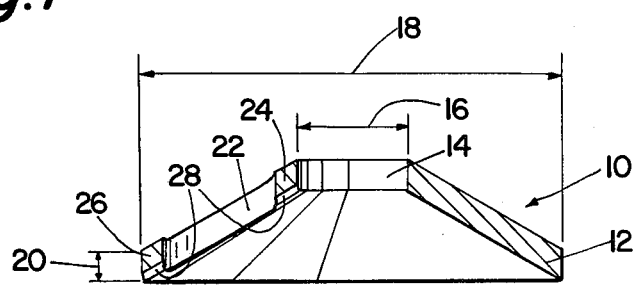
FIG. 3 is a sectional view taken along the line 3—3 in FIG. 1.
Figure 4:
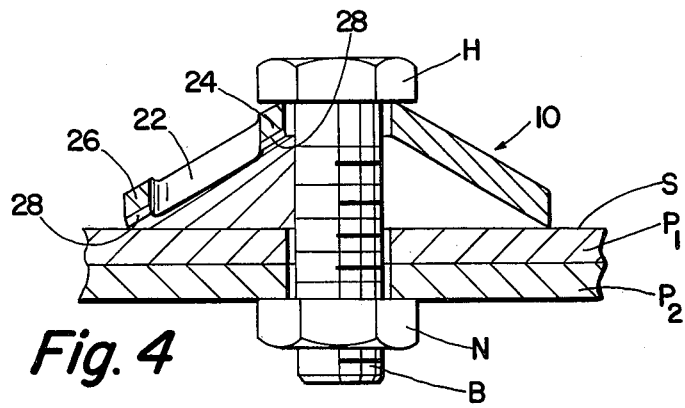
FIG. 4 is a view partially in section and partially in elevation showing a joint utilizing the washer of the present invention wherein the washer is indicating that the tension in the bolt is less than a predetermined minimum tension.
Figure 5:
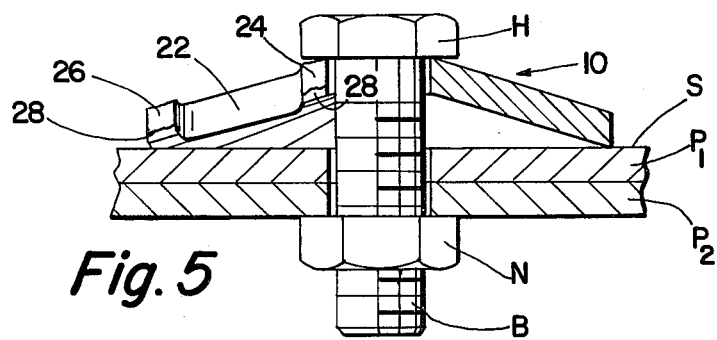
FIG. 5 is a view similar to FIG. 4 wherein the washer of the present invention has cracked and is functioning as a lock washer and is indicating that the bolt has been tightened to a tension greater than the predetermined minimum tension but less than the predetermined maximum tension.

Referring to the drawings, and to FIGS. 1, 2 and 3 in particular, the tension indicating and lock cone washer 10 of the present invention is illustrated in its undeformed, non-cracked condition. As is well known in the art, and is illustrated in FIGS. 4 and 5, the washer 10 is adapted to be compressed between the head H of a headed fastener, such as bolt B, and a bearing surface, such as the surface S, of a plate or the like. It is understood that the compression force applied to washer 10 by the head H of bolt B will be equal, or at least substantially equal, to the tension in bolt B.

While the fastener 10 of the present invention is illustrated in connection with a joint comprising a headed bolt B, a plurality of plates, $P_1$ and $P_2$, and a nut N, the washer 10 is also suitable for many other types of joints and/or assemblies and for indicating tension in other types of headed fasteners.

The washer 10 comprises a generally annular body 12 with a generally annular aperture 14 therethrough. The body 12, viewed from the top and bottom as in FIGS. 1 and 2, is defined by an inner diameter 16 and an outer diameter 18. As may be seen, the body 12 is of a generally frustoconical cross-section. The thickness 20 of the body 12, hardness of material, etc. is selected to provide suitable operating characteristics.

A generally radially extending through slot 22 is provided which extends from a point radially inward of the outer diameter to a point radially outward of the inner diameter. A radially inward web 24 and a radially outward web 26 are defined by the remaining material radially alighed with the slot 22. It is understood that washers wherein the slot extends completely to the outer diameter 18 leaving only radially inward web 24 or wherein the slot extends completely to the inner diameter 16 leaving only radially outward web 26 are also within the scope of the present invention. As a plane passing through the axis of aperture 14 and the webs 24 and 26 defines the weakest section of body 12, the compression force required to split body 12 is a function of the cross-sectional area of the webs. Accordingly, the compression force required to crack or split the washer may be selectively varied by varying the cross-sectional area of the web. To this end, a groove or grooves 28 may be formed in the webs to reduce the cross-sectional area thereof. By utilizing grooves of variable depth, or no grooves, a single basic washer structure 10 may be simply and easily modified to provide a series or family of torque indicating washers each indicating when a different predetermined tension is present in the headed fastener associated therewith.

The washer 10 is designed so that it will act as a split spring lock washer after cracking thereof and so that it will not completely flatten until a compression force exceeding the force required to crack the washer is applied thereto.

The use of washer 10 in combination with a bolt B and nut N to join two members, such as panels or plates P₁ and P₂ is illustrated in FIGS. 4 and 5. In a typical situation, the tension within bolt B must be within a predetermined range to assure proper joining of the plates, to provide resistance to loosening of the nut and to assure that the bolt is not stressed beyond its elastic limit which would render the bolt highly subject to failure. In the typical assembly illustrated, the washer 10 is assembled interposed the head H of the bolt B and the bearing surface S. As the nut N is tightened on the bolt, the washer will be compressed between the head H and the surface S with a compression force equal, or substantially equal, to the tension in the bolt.

By selecting a washer 10 wherein the cross-section of the webs 24 and 26 will cause the washer to crack at a compression force equal to the minimum acceptable tension in the bolt and of a thickness and hardness such that the washer when split will act as a lock washer and not flatten until a compression force equal to the predetermined maximum tension in the bolt is applied thereto, the washer 10 will provide an accurate indication that the torque in the bolt is within predetermined limits while also acting as a lock washer.

In operation, the panels or plates P₁ and P₂ are aligned and the shank of the bolt is passed through the plate apertures with the washer 10 interposed head H and surface S. The nut N is then tightened down on the threads of bolt B until washer 10 is firmly engaged with surface S (see FIG. 4). Further tightening of the nut N will result in recreased tension being applied to bolt B (with correspondingly increasing compression of washer 10). When the tension in the bolt reaches the predetermined minimum value, the corresponding compression force will cause webs 24 and 26 to crack thus splitting the washer. The cracking of the washer will result in an audible noise and a detectable give to the party tightening the nut, thus indicating that the predetermined minimum tension in the bolt B has been obtained. A further tightening of the nut to the degree not sufficient to fully flatten the washer 10 will indicate that tension in the bolt is less than the predetermined maximum tension (see FIG. 5). As the cracked condition of the washer is clearly visable, the use of the washer allows for quick and easy inspection of the joint as is often highly desirable in an assembly line operation.

While the present invention has been described in its preferred form, various modifications and rearrangements thereof are possible within the spirit and the scope of the invention as herein claimed.

I claim:

1. A tension indicating the lock cone washer for use in connection with a headed fastener and bearing surface, said washer adapted to be compressed between the head of the headed fastener and the bearing surface to indicate the tension in the headed fastener is within a predetermined range comprising a predetermined minimum and maximum tension, said washer comprising a generally annular body of non-malleable material having a generally centrally located aperture therethrough, said body defined by an inner and an outer diameter, said body of a generally frustoconical shape in cross-section, a generally radially extending through slot extending from adjacent the inner diameter to adjacent the other diameter, at least one web defined by the remaining material aligned with the slot adjacent at least one of the inner and the outer diameter of the body, said web defining remaining material of a cross sectional area, taken on a plane containing the axis of said aperture, selected to result in through cracking of said web defining remaining material when said body is subject to a compression force equal in magnitude to the predetermined minimum tension.

2. The tension indicating and lock cone washer of claim 1 wherein said body defines a radially inward web adjacent said inner diameter and a radially outward web adjacent said outer diameter.

3. The tension indicating and lock cone washer of claim 1, or 2 wherein said body, after cracking thereof, will resiliently resist complete flattening at compression forces of a magnitude less than the predetermined maximum tension and will fully flatten at compression forces of a magnitude equal or greater than the predetermined maximum tension.

4. The tension indicating and lock cone washer of claim 3 wherein the compression force required to crack said body is a function of the web cross-sectional area, grooves aligned with said slot are provided in said web defining remaining material, the depth of said grooves inversely proportional to the magnitude of compression force required to crack said body.

* * * * *